United States Patent
Chen

(10) Patent No.: US 9,965,044 B2
(45) Date of Patent: May 8, 2018

(54) INFORMATION PROCESSING METHOD, APPARATUS, AND DEVICE

(71) Applicant: Huawei Device (Dongguan) Co., Ltd., Dongguan (CN)

(72) Inventor: Lei Chen, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 0 days. days.

(21) Appl. No.: 15/114,033

(22) PCT Filed: Jan. 23, 2015

(86) PCT No.: PCT/CN2015/071424
§ 371 (c)(1),
(2) Date: Jul. 25, 2016

(87) PCT Pub. No.: WO2015/110063
PCT Pub. Date: Jul. 30, 2015

(65) Prior Publication Data
US 2016/0342217 A1    Nov. 24, 2016

(30) Foreign Application Priority Data

Jan. 26, 2014    (CN) .......................... 2014 1 0038752

(51) Int. Cl.
*G06F 3/00* (2006.01)
*G06F 3/01* (2006.01)
(Continued)

(52) U.S. Cl.
CPC .............. *G06F 3/017* (2013.01); *G06F 1/163* (2013.01); *G06F 3/014* (2013.01); *G06F 3/015* (2013.01);
(Continued)

(58) Field of Classification Search
CPC .. G06F 3/04883; G06F 3/017; G06F 3/04886; G06F 3/014; G06F 1/163;
(Continued)

(56) References Cited

U.S. PATENT DOCUMENTS 7,109,970 B1    9/2006    Miller
8,436,821 B1    5/2013    Plichta et al.
(Continued)

FOREIGN PATENT DOCUMENTS

CN    1482527 A    3/2004
CN    200944218 Y    9/2007
(Continued)

*Primary Examiner* — Muhammad N Edun
(74) *Attorney, Agent, or Firm* — Slater Matsil, LLP

(57) ABSTRACT

An information processing method, device and apparatus are disclosed. An information processing apparatus acquires a mode-enabling gesture information of a user. An input mode corresponding to the mode-enabling gesture information is enabled. The input mode includes a keyboard input mode and a mouse input mode. Gesture information of the user is acquired in the input mode. The gesture information includes at least one of tap-gesture information and slide-gesture information. An operation instruction corresponding to the gesture information is generated according to a preset correspondence between gesture information and an operation instruction.

16 Claims, 8 Drawing Sheets

---

Acquire a pressure value of each part of a wrist or a palm when a sensor disposed on the wrist or the palm of a user detects an input mode-enabling gesture motion or a gesture motion of the user — 301

Determine a displacement value of the sensor on the wrist or the palm of the user according to the pressure value — 302

Determine, according to the displacement value, mode-enabling gesture information input by the user — 303

(51) Int. Cl.
*G06F 1/16* (2006.01)
*G06F 3/02* (2006.01)
*G06F 3/038* (2013.01)
*G06F 3/041* (2006.01)
*G06F 3/0488* (2013.01)

(52) U.S. Cl.
CPC ............ *G06F 3/0219* (2013.01); *G06F 3/038* (2013.01); *G06F 3/0414* (2013.01); *G06F 3/04883* (2013.01); *G06F 3/04886* (2013.01)

(58) Field of Classification Search
CPC ...... G06F 3/0414; G06F 3/0219; G06F 3/038; G06F 3/015
See application file for complete search history.

(56) References Cited

U.S. PATENT DOCUMENTS

| | | | |
|---|---|---|---|
| 8,743,052 B1 * | 6/2014 | Keller | G06F 3/014 345/156 |
| 2003/0056278 A1 | 3/2003 | Kuo et al. | |
| 2005/0172734 A1 | 8/2005 | Alsio et al. | |
| 2008/0129694 A1 | 6/2008 | Haven | |
| 2009/0091530 A1 | 4/2009 | Yoshida | |
| 2011/0133934 A1 | 6/2011 | Tan et al. | |
| 2012/0242584 A1 | 9/2012 | Tuli | |
| 2012/0319940 A1 | 12/2012 | Bress et al. | |
| 2013/0082922 A1 | 4/2013 | Miller | |
| 2013/0265218 A1 | 10/2013 | Moscarillo | |

FOREIGN PATENT DOCUMENTS

| | | |
|---|---|---|
| CN | 101142616 A | 3/2008 |
| CN | 101226438 A | 7/2008 |
| CN | 201638148 U | 11/2010 |
| CN | 201780561 U | 3/2011 |
| CN | 103793057 A | 5/2014 |
| JP | 2005352739 A | 12/2005 |
| JP | 2008135033 A | 6/2008 |
| JP | 2014115688 A | 6/2014 |
| RU | 2457532 C2 | 7/2012 |
| WO | 2006028313 A1 | 3/2006 |
| WO | 2013126905 A2 | 8/2013 |

* cited by examiner

INFORMATION PROCESSING METHOD, APPARATUS, AND DEVICE

CROSS-REFERENCE TO RELATED APPLICATIONS

This patent application is a national phase filing under section 371 of PCT/CN2015/071424, filed Jan. 23, 2015, which claims the priority of Chinese patent application 201410038752.7, filed Jan. 26, 2014, each of which is incorporated herein by reference in its entirety.

TECHNICAL FIELD

The present invention relates to the field of information processing technologies, and more specifically, to an information processing method, apparatus, and device.

BACKGROUND

In recent years, intelligent devices have been increasingly and widely deployed and applied with the development of science and technologies. To satisfy increasing user requirements on richer functions and more diversified forms of the intelligent devices, input manners of the intelligence devices become more intelligent and richer.

In the prior art, to make it convenient for a user to interact with an intelligent device, a gesture control arm ring is developed. When in use, the gesture control arm ring needs to be worn around a wrist of the user, and implements human-computer interaction by detecting a bioelectricity change that is generated by arm or wrist muscles when the user is in motion, and in combination with monitoring of an arm physical action. The gesture control arm ring may trigger an operation by using a specific action. For example, an action that the user makes a first and then shakes the wrist up and down for three times may be set as a corresponding action for enabling a device.

However, there are many operations that can be performed on the intelligent device. If the user wants to operate the intelligent device by using the gesture control arm ring in the prior art, the user needs to remember many correspondences between gesture motions and operations, which makes it extremely inconvenient for the user to use the intelligent device.

SUMMARY

In view of this, the present invention provides an information processing method, apparatus, and device, so as to resolve a problem in the prior art that because a specific trigger operation needs to correspond to a specific gesture motion, a user needs to memorize multiple correspondences between gesture motions and operations.

To achieve the foregoing objective, the present invention provides the following technical solutions.

According to a first aspect, the present application discloses an information processing method, including acquiring mode-enabling gesture information of a user and enabling an input mode corresponding to the mode-enabling gesture information, where the input mode includes a keyboard input mode and a mouse input mode. The information processing method also includes acquiring gesture information of the user in the input mode, where the gesture information includes tap-gesture information and/or slide-gesture information and generating, according to a preset correspondence between gesture information and an operation instruction, an operation instruction corresponding to the gesture information.

In a first possible implementation manner of the first aspect, when the input mode is the keyboard input mode, there is a one-to-one correspondence between 12 finger joints or finger phalanxes of an index finger, a middle finger, a ring finger, and a little finger of a user and 12 keys of a 12-key keypad; the acquiring gesture information of the user in the input mode includes: acquiring, in the keyboard input mode, tap-gesture information of tapping any finger joint or finger phalanx of the index finger, the middle finger, the ring finger, and the little finger by the user; and correspondingly, the generating, according to a preset correspondence between gesture information and an operation instruction, an operation instruction corresponding to the gesture information includes: generating, according to a preset correspondence between tap-gesture information and an operation instruction, an operation instruction corresponding to the tap-gesture information.

In a second possible implementation manner of the first aspect, when the input mode is the mouse input mode, the acquiring gesture information of the user in the input mode includes: acquiring, in the mouse input mode, slide-gesture information of sliding on an index finger, a middle finger, a ring finger, and a little finger of the user and/or tap-gesture information of tapping a finger joint or a finger phalanx; and correspondingly, the generating, according to a preset correspondence between gesture information and an operation instruction, an operation instruction corresponding to the gesture information includes: generating, according to a preset correspondence between slide-gesture information and/or tap-gesture information and an operation instruction, an operation instruction corresponding to the slide-gesture information and/or the tap-gesture information, where the slide-gesture information is corresponding to movement track information of a mouse pointer, and the tap-gesture information is corresponding to trigger information of a left or right mouse button.

In a third possible implementation manner of the first aspect, the enabling an input mode corresponding to the mode-enabling gesture information includes: enabling the keyboard input mode when the mode-enabling gesture information is corresponding to a gesture of extending an index finger, a middle finger, a ring finger, and a little finger of the user; and enabling the mouse input mode when the mode-enabling gesture information is corresponding to a gesture of curling the index finger, the middle finger, the ring finger, and the little finger toward the palm of the user, where the mode-enabling gesture information or the gesture information is detected by a sensor disposed on a wrist or a palm of the user.

In a fourth possible implementation manner of the first aspect, the acquiring mode-enabling gesture information of a user or the acquiring gesture information of the user in the input mode includes: acquiring a pressure value of each part of the wrist or the palm when the sensor disposed on the wrist or the palm of the user detects an input mode-enabling gesture motion or a gesture motion of the user; determining a displacement value of the sensor on the wrist or the palm of the user according to the pressure value; and determining, according to the displacement value, mode-enabling gesture information input by the user.

In any one of the foregoing implementation manners of the first aspect, after the generating, according to a preset correspondence between gesture information and an operation instruction, an operation instruction corresponding to the gesture information, the method further includes: sending the operation instruction to a terminal so that the terminal responds to the operation instruction.

According to a second aspect, an information processing method is disclosed, including confirming that a keyboard input mode is entered, where in the keyboard input mode, there is a one-to-one correspondence between 12 finger joints or finger phalanxes of an index finger, a middle finger, a ring finger, and a little finger of a user and 12 keys of a 12-key keypad and acquiring tap-gesture information of tapping any finger joint or finger phalanx of the index finger, the middle finger, the ring finger, and the little finger by the user. The information processing method also includes generating, according to a preset correspondence between tap-gesture information and an operation instruction, an operation instruction corresponding to the tap-gesture information.

According to a third aspect, an information processing method is disclosed, including: confirming that a mouse input mode is entered; acquiring slide-gesture information of a user on an index finger, a middle finger, a ring finger, and a little finger and/or tap-gesture information of tapping a finger joint or a finger phalanx of the index finger, the middle finger, the ring finger, and the little finger by the user; and generating, according to a preset correspondence between slide-gesture information and/or tap-gesture information and an operation instruction, an operation instruction corresponding to the slide-gesture information and/or the tap-gesture information, where the slide-gesture information is corresponding to movement track information of a mouse pointer, and the tap-gesture information is corresponding to trigger information of a left or right mouse button.

According to a fourth aspect, an information processing apparatus is disclosed, including: a first acquiring module, configured to acquire mode-enabling gesture information of a user; a mode enabling module, configured to enable an input mode corresponding to the mode-enabling gesture information, where the input mode includes a keyboard input mode and a mouse input mode; a second acquiring module, configured to acquire gesture information of the user in the input mode, where the gesture information includes tap-gesture information and/or slide-gesture information; and an instruction generation module, configured to generate, according to a preset correspondence between gesture information and an operation instruction, an operation instruction corresponding to the gesture information.

In a first possible implementation manner of the fourth aspect, when the input mode is the keyboard input mode, there is a one-to-one correspondence between 12 finger joints or finger phalanxes of an index finger, a middle finger, a ring finger, and a little finger of a user and 12 keys of a 12-key keypad; the second acquiring module is specifically configured to: acquire, in the keyboard input mode, tap-gesture information of tapping any finger joint or finger phalanx of the index finger, the middle finger, the ring finger, and the little finger by the user.

In a second possible implementation manner of the fourth aspect, when the input mode is the mouse input mode, the second acquiring module is specifically configured to: acquire, in the mouse input mode, slide-gesture information of sliding on an index finger, a middle finger, a ring finger, and a little finger of the user and/or tap-gesture information of tapping a finger joint or a finger phalanx, where the slide-gesture information is corresponding to movement track information of a mouse pointer, and the tap-gesture information is corresponding to trigger information of a left or right mouse button.

In a third possible implementation manner of the fourth aspect, the mode enabling module includes: a first mode enabling module, configured to enable the keyboard input mode when the mode-enabling gesture information is corresponding to a gesture of extending an index finger, a middle finger, a ring finger, and a little finger of the user; and a second mode enabling module, configured to enable the mouse input mode when the mode-enabling gesture information is corresponding to a gesture of curling the index finger, the middle finger, the ring finger, and the little finger toward the palm of the user.

In a fourth possible implementation manner of the fourth aspect, the mode-enabling gesture information or the gesture information are detected by a sensor disposed on a wrist or a palm of the user.

In a fifth possible implementation manner of the fourth aspect, the first acquiring module or the second acquiring module includes: an acquiring submodule, configured to acquire a pressure value of each part of the wrist or the palm when the sensor disposed on the wrist or the palm of the user detects an input mode-enabling gesture motion or a gesture motion of the user; a calculation module, configured to determine a displacement value of the sensor on the wrist or the palm of the user according to the pressure value; and a gesture determining module, configured to determine, according to the displacement value, mode-enabling gesture information input by the user.

In any one of the foregoing possible implementation manners of the fourth aspect, the apparatus further includes: an instruction transfer module, configured to send the operation instruction to a terminal so that the terminal responds to the operation instruction.

According to a fifth aspect, an information processing apparatus is disclosed, including: a first input enabling module, configured to confirm that a system enters a keyboard input mode, where in the keyboard input mode, there is a one-to-one correspondence between 12 finger joints or finger phalanxes of an index finger, a middle finger, a ring finger, and a little finger of a user and 12 keys of a 12-key keypad; a first gesture acquiring module, configured to acquire tap-gesture information of tapping any finger joint or finger phalanx of the index finger, the middle finger, the ring finger, and the little finger by the user; and a first instruction generation module, configured to generate, according to a preset correspondence between tap-gesture information and an operation instruction, an operation instruction corresponding to the tap-gesture information.

According to a sixth aspect, an information processing apparatus is disclosed, including: a second input enabling module, configured to confirm that a system enters a mouse input mode; a second gesture acquiring module, configured to acquire slide-gesture information of a user on an index finger, a middle finger, a ring finger, and a little finger and/or tap-gesture information of tapping a finger joint or a finger phalanx of the index finger, the middle finger, the ring finger, and the little finger by the user; and a second instruction generation module, configured to generate, according to a preset correspondence between slide-gesture information and/or tap-gesture information and an operation instruction, an operation instruction corresponding to the slide-gesture information and/or the tap-gesture information.

According to a seventh aspect, an information processing device is disclosed, where the information processing device includes any one of the foregoing information processing apparatuses.

According to an eighth aspect, an intelligent terminal is disclosed, where the intelligent terminal includes any one of the foregoing information processing apparatuses.

It may be learned from the foregoing technical solution that, compared with the prior art, embodiments of the present invention disclose an information processing method, apparatus, and device. In the information processing method, mode-enabling gesture information input by a user is first acquired; then a corresponding input mode is entered according to the mode-enabling gesture information input by the user, and gesture information of the user is identified in a determined input mode; further, a user intention is identified according to a preset correspondence between gesture information and an operation instruction. The foregoing input mode includes a keyboard input mode and a mouse input mode. In this way, the user can implement convenient control of a terminal in a familiar input mode environment by using only a customary input operation manner, for example, a tap operation and a touch-slide operation. In this method, the apparatus and the device do not require the user to memorize multiple correspondences between specific gesture motions and specific operations. Only by implanting beforehand a correspondence between a customary basic input operation of a user and a standard keyboard and/or mouse operation event into an execution body of the information processing method, a purpose of controlling the terminal by the user in a customary operation manner can be achieved.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely the embodiments of the present invention, and a person of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
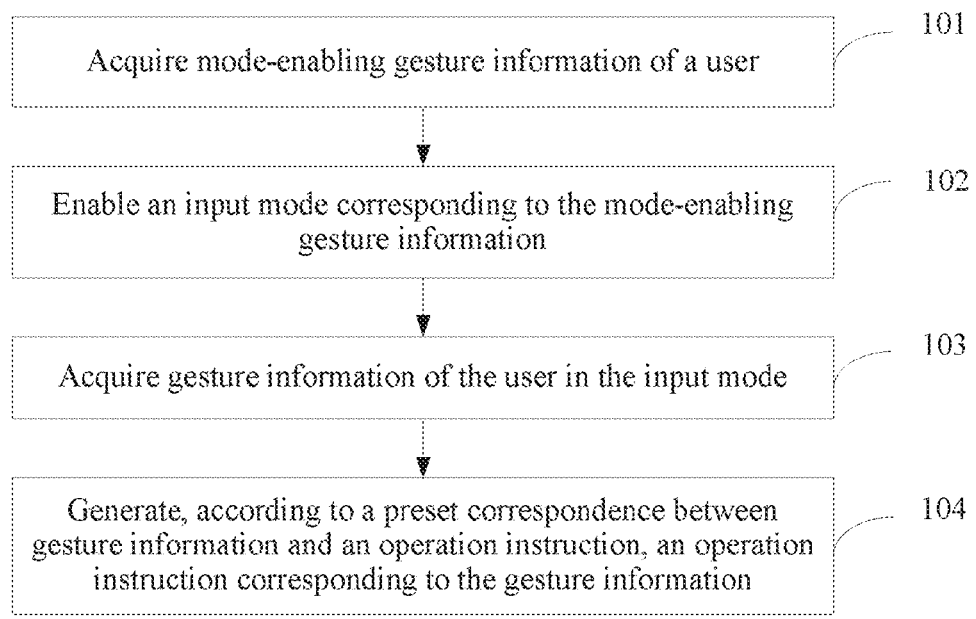
FIG. 1 is a flowchart of an information processing method according to an embodiment of the present invention.

FIG. 1 is a flowchart of an information processing method according to an embodiment of the present invention. As shown in FIG. 1, the method may include:

Step 101: Acquire mode-enabling gesture information of a user.

In this embodiment of the present invention, there may be multiple input modes for the user, and each input mode is corresponding to one mode-enabling gesture. In this way, an execution body of the information processing method disclosed in this embodiment of the present invention may automatically identify, according to mode-enabling gesture information input by the user, an input mode currently wanted by the user, which facilitates use for the user.

Step 102: Enable an input mode corresponding to the mode-enabling gesture information.

The input mode may include a keyboard input mode and a mouse input mode. The keyboard input mode described herein indicates that in this mode, the user may directly trigger a character on a known keyboard by tapping a part of a finger, where the character may be a digit, an English letter, or a symbol with a fixed function, for example, a "#" key. Certainly, it is required to preconfigure a correspondence between gesture information of tapping or triggering a part of a finger by the user and each key of the known keyboard. The foregoing mouse input mode indicates that in this mode, the user may perform a corresponding operation on a finger or a palm like operating a mouse. In this case, an operation may include a slide operation and a tap operation. For example, a thumb of the user slides leftwards on a finger or the palm, which is corresponding to a leftward slide of a mouse pointer; the user taps a part of a finger or the palm, which is corresponding to a click on a left mouse button. Certainly, in this case, it is also required to preconfigure a correspondence between gesture information of a user and a standard mouse operation event.

Step 103: Acquire gesture information of the user in the input mode.

The gesture information may include tap-gesture information and/or slide-gesture information.

It should be noted that, for same gesture information, different processing and response results may be obtained in different input modes, and a piece of gesture information may be processed and responded to in one input mode, but may not be processed and responded to in another input mode. It has been described in the foregoing that, in the keyboard input mode, a character that the user wants to trigger may be determined by acquiring gesture information of tapping a part of the palm by the user. In this mode, if the user inputs slide-gesture information, a system does not process and respond to the slide-gesture information. However, if the user inputs slide-gesture information in the mouse input mode, the slide-gesture information is processed and responded to, because the slide-gesture information may be corresponding to a mouse pointer movement operation. In addition, such a correspondence accords with a user habit of performing an input operation on a computer interface by using a mouse or performing an input operation directly on a touchscreen interface in the prior art. For example, the user may experience corresponding up, down, left, and right page-turning operations on the touchscreen by moving the thumb up, down, left, and right on the palm.

Step 104: Generate, according to a preset correspondence between gesture information and an operation instruction, an operation instruction corresponding to the gesture information.

A correspondence between gesture information and an operation instruction is implanted beforehand into a system program, which can be implemented by using the prior art. However, in this embodiment of the present invention, multiple input modes are introduced, and there is a separate correspondence between gesture information and an operation instruction in each input mode, because different processing and response results may be obtained in different input modes for same gesture information, which has been described above.

Further, the operation instruction generated according to the gesture information of the user may be transferred to a terminal, so that the terminal performs a response operation according to the operation instruction.

In the information processing method in this embodiment, mode-enabling gesture information input by a user is first acquired; then a corresponding input mode is entered according to the mode-enabling gesture information input by the user, and gesture information of the user is identified in a determined input mode; further, a user intention is identified according to a preset correspondence between gesture information and an operation instruction. The foregoing input mode includes a keyboard input mode and a mouse input mode. In this way, the user can implement convenient control of a terminal in a familiar input mode environment by using only a customary input operation manner, for example, a tap operation and a touch-slide operation. In this method, the user does not need to memorize multiple correspondences between specific gesture motions and specific operations. Only by implanting beforehand a correspondence between a customary basic input operation of a user and a standard keyboard and mouse operation event into an execution body of the information processing method, a purpose of conveniently performing an input operation and controlling the terminal by the user in a customary operation manner can be achieved.

Figure 2:
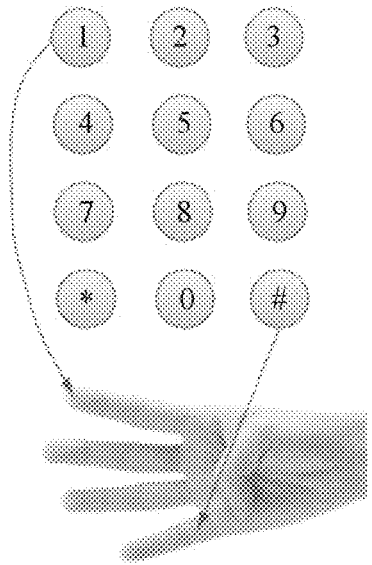
FIG. 2 is a schematic diagram of a correspondence between 12 keys of a 12-key keypad according to an embodiment of the present invention.

In the foregoing embodiment, when mode-enabling gesture information acquired by a system is a mode-enabling gesture corresponding to the keyboard input mode, the system enables the keyboard input mode. In this mode, there may be a one-to-one correspondence between 12 finger joints or finger phalanxes of an index finger, a middle finger, a ring finger, and a little finger of a user and 12 keys of a 12-key keypad. It is known to all that the 12-key keypad includes 1, 2 (abc), 3 (def), 4 (ghi), 5 (jkl), 6 (mno), 7 (pqrs), 8 (tuv), 9 (wyxz), *, 0, and # keys. In addition, in a hand structure, each of an index finger, a middle finger, a ring finger, and a little finger includes three finger joints and three finger phalanxes, and the index finger, the middle finger, the ring finger, and the little finger altogether include 12 finger joints and 12 finger phalanxes. In addition, a 4*3 array of the 12 keys of the 12-key keypad is the same as a 4*3 array of the 12 finger joints or finger phalanxes of the index finger, the middle finger, the ring finger, and the little finger in the hand structure. Reference may be made to FIG. 2, and FIG. 2 is a schematic diagram of a correspondence between 12 keys of a 12-key keypad according to an embodiment of the present invention. A first finger phalanx of the index finger may be corresponding to the "1" key, a second finger phalanx of the index finger may be corresponding to the "2" key, . . . , and a third finger phalanx of the little finger may be corresponding to the "#" key.

Certainly, a correspondence between keys of a 12-key keypad and 12 finger joints or finger phalanxes is not fixedly limited to the foregoing manner. It may also be set that three finger joints of the little finger are respectively corresponding to the "1" key, the "2" key, and the "3" key, and three finger joints of the index finger are respectively corresponding to the "*" key, the "0" key, and the "#" key. A specific correspondence may be set according to user preference and habits.

In this way, in the foregoing embodiment, step 103 of acquiring gesture information of the user in the input mode may include: acquiring, in the keyboard input mode, tap-gesture information of tapping any finger joint or finger phalanx of the index finger, the middle finger, the ring finger, and the little finger by the user.

Correspondingly, step 104 of generating, according to a preset correspondence between gesture information and an operation instruction, an operation instruction corresponding to the gesture information may include: generating, according to a preset correspondence between tap-gesture information and an operation instruction, an operation instruction corresponding to the tap-gesture information.

In this embodiment, keys of a 12-key keypad are respectively one-to-one corresponding to 12 finger joints or finger phalanxes, and such a correspondence is preconfigured in a system. Because basically all users are extremely familiar with a usage method of the 12-key keypad, and can also accurately sense locations of several finger joints or finger phalanxes, the users can conveniently and quickly implement information input without needing to memorize a correspondence between each key of a 12-key keypad and a fixed gesture motion.

In a first embodiment, when mode-enabling gesture information acquired by a system is a mode-enabling gesture corresponding to the mouse input mode, the system enables the mouse input mode. In this mode, step 103 of acquiring gesture information of the user in the input mode may include: acquiring, in the mouse input mode, slide-gesture information of sliding on an index finger, a middle finger, a ring finger, and a little finger of the user and/or tap-gesture information of tapping a finger joint or a finger phalanx.

Correspondingly, step 104 of generating, according to a preset correspondence between gesture information and an operation instruction, an operation instruction corresponding to the gesture information may include: generating, according to a preset correspondence between slide-gesture information and/or tap-gesture information and an operation instruction, an operation instruction corresponding to the slide-gesture information and/or the tap-gesture information.

In the mouse input mode, it may be preconfigured that the slide-gesture information of the user is corresponding to movement track information of a mouse pointer, and the tap-gesture information of the user is corresponding to trigger information of a left or right mouse button. Specifically, the user may curl four fingers except the thumb to form a "panel". The thumb may move on the "panel" to simulate a mouse movement on a display screen. Certainly, a correspondence between gesture information of a user and a standard mouse operation event needs to be preconfigured. In consideration of a user habit of using a PAD and performing an operation by using a mouse, leftward slide-gesture information of the user may be directly corresponding to a leftward mouse pointer movement operation, upward slide-gesture information of the user may be directly corresponding to an upward mouse pointer movement operation, and so on. In this way, the thumb of user is equivalent to the mouse on the "panel" formed by the four fingers, and the "panel" is equivalent to the display screen. Gesture information of the thumb of user on the "panel" may also be corresponding to a user operation event of operating a physical touchscreen, so that the user can experience an operation on the touchscreen by using the "panel" formed by the four fingers.

In an actual scenario, the mouse includes a left button and a right button. To facilitate use for the user, in this embodiment, in the mouse input mode, a gesture motion of tapping any fingertip of the index finger, the middle finger, the ring finger, and the little finger by the user may be defined as a left mouse button trigger operation; a gesture motion of tapping any finger root of the index finger, the middle finger, the ring finger, and the little finger by the user may be defined as a right mouse button trigger operation. Alternatively, a gesture motion of tapping the fingertip of the index finger by the user may be defined as a left mouse button trigger operation, a gesture motion of tapping the fingertip of the middle finger by the user may be defined as a right mouse button trigger operation, or the like, which is not limited herein.

In this embodiment, several pieces of fixed gesture information of a user are corresponding to several basic operations of mouse operations, so that the user directly implements an input operation by performing a gesture motion on a palm in a familiar mouse operation manner or touchscreen operation manner, which is convenient and efficient, and the user does not need to memorize multiple correspondences between gesture motions and operations.

It may be understood that, in the foregoing embodiment, mode-enabling gestures corresponding to different input modes are not fixedly limited. To facilitate use for a user, in this embodiment, step 102 that is in the first embodiment and is of enabling an input mode corresponding to the mode-enabling gesture information is specifically: enabling the keyboard input mode when the mode-enabling gesture information is corresponding to a gesture of extending an index finger, a middle finger, a ring finger, and a little finger of the user; and enabling the mouse input mode when the mode-enabling gesture information is corresponding to a gesture of curling the index finger, the middle finger, the ring finger, and the little finger toward the palm of the user.

Because the user may unconsciously separate several fingers when tapping different finger joints or finger phalanxes of the index finger, the middle finger, the ring finger, and the little finger, the gesture of extending the index finger, the middle finger, the ring finger, and the little finger of the user is corresponding to the keyboard input mode; the gesture of curling the index finger, the middle finger, the ring finger, and the little finger toward the palm of the user is corresponding to the mouse input mode, and a "panel" formed by the four curled fingers may be used to simulate a display screen, which is relatively close to a user operation habit. Certainly, mode-enabling gestures of the keyboard input mode and the mouse input mode are not fixedly limited.

In the foregoing embodiment, the mode-enabling gesture information or the gesture information may be detected by a sensor disposed on a wrist or a palm of the user.

It should be noted that, the sensor disposed on the wrist or the palm of the user can detect a mode-enabling gesture motion or a gesture motion of a hand with the sensor.

Figure 3:
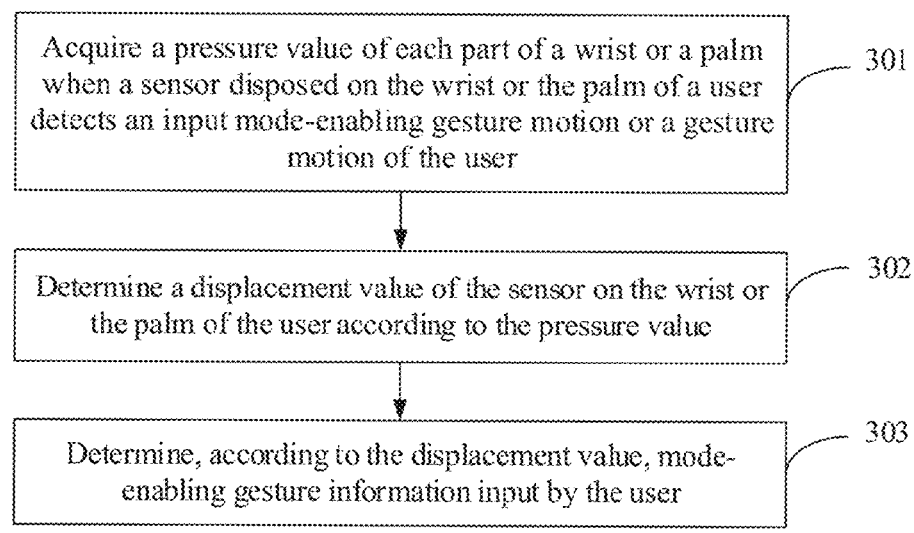
FIG. 3 is a flowchart of acquiring mode-enabling gesture information or gesture information of a user according to an embodiment of the present invention.

FIG. 3 is a flowchart of acquiring mode-enabling gesture information or gesture information of a user according to an embodiment of the present invention. As shown in FIG. 3, a specific process of the acquiring mode-enabling gesture information of a user and the acquiring gesture information of the user may include:

Step 301: Acquire a pressure value of each part of a wrist or a palm when a sensor disposed on the wrist or the palm of a user detects an input mode-enabling gesture motion or a gesture motion of the user.

The sensor disposed on the wrist of the user may be disposed in a wristband, and the sensor disposed on the palm of the user may be disposed in a glove or a mitten. If the sensor is disposed on the wrist of the user, gesture motions of the user may be determined according to different pressure that is caused by a muscle change and a motion change of each part of the wrist when the user makes different gestures. If the sensor is disposed on the palm of the user, gesture motions of the user may also be determined according to different pressure caused by a muscle change and a motion change of each part of the palm. If the sensor is disposed on a finger of the user, the sensor on the finger may directly detect touch information of a thumb of the user, to further determine gesture information of the user. It should be noted that, regardless of a location of the sensor disposed on the user hand, the sensor not only may be used to detect related sensing information of a mode-enabling gesture, but also may be used to detect sensing information of a related gesture when the user performs a slide operation or a tap operation on the palm or the finger after a system enters a keyboard input mode or a mouse input mode.

Step 302: Determine a displacement value of the sensor on the wrist or the palm of the user according to the pressure value.

Generally, a larger pressure change indicates a larger displacement value. After the user wears an apparatus with a sensor, in a case in which the user does not make any gesture motion, contact pressure between the apparatus with a sensor and user hand skin has a basically stable initial value. However, when the user makes a gesture motion, a pressure value of a part of the hand may become larger, or may become smaller. Therefore, displacement of hand muscles also has different vector directions. Larger pressure indicates a larger displacement value of the sensor shifting from an original location. In this embodiment, there may be multiple sensors disposed on the wrist or the palm of the user, and the sensors may be disposed on different parts according to a requirement, so as to improve accuracy of a detection result.

Step 303: Determine, according to the displacement value, mode-enabling gesture information input by the user.

Figure 4:
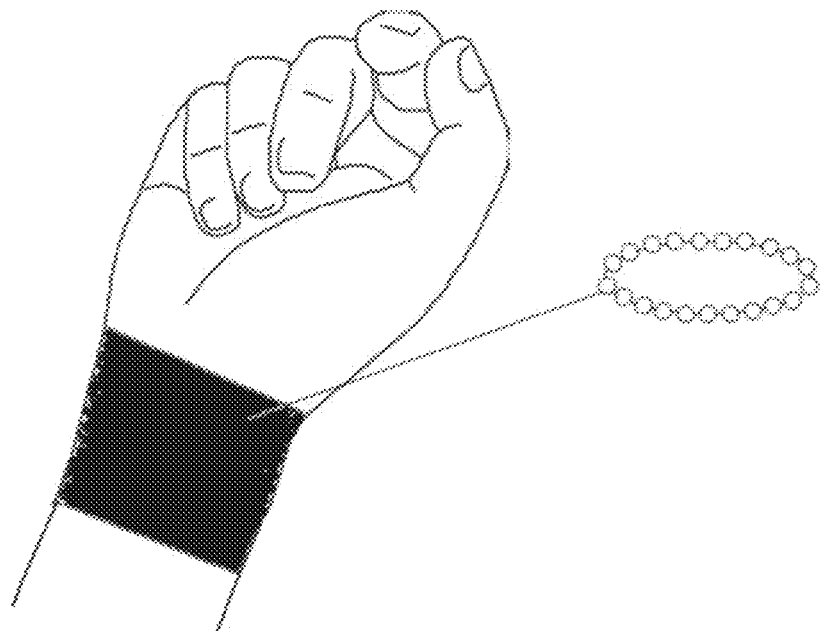
FIG. 4 is a schematic diagram of a location of a sensor disposed in a wristband according to an embodiment of the present invention.

FIG. 4 is a schematic diagram of a location of a sensor disposed in a wristband according to an embodiment of the present invention. As shown in FIG. 4, a round of pressure sensors may be disposed in the wristband, where when a user gesture changes, each sensor may obtain, according to a measured pressure variation value, a location offset of the sensor from an initial location of the sensor (that is, a location of the sensor when the user does not make any motion, and a hand is in a natural state). In this way, as long as a muscle group of a user wrist changes because of a finger motion, a gesture motion of the user may be finally determined according to data detected by the sensors. A muscle group closer to a finger changes more obviously. Therefore, the sensors in the wristband may be disposed at a location close to the finger.

In an actual situation, a location at which the user wears the wristband each time may be different. Therefore, data detected by the sensors in the wristband each time also is different, thereby affecting accuracy of a detection result. In this embodiment, to address impact of the foregoing problem on the accuracy of the detection result, the following provides two solutions.

Solution 1: Build a database as comprehensive as possible to store a correspondence between data detected by a sensor and a gesture motion when the wristband is at different locations.

Solution 2: Dispose multiple rounds of sensors in the wristband. When using the wristband for the first time, the user may use data detected by a round of sensors located in the middle of the wristband, and complete related calibration work, so as to ensure that the round of sensors located in the middle of the wristband can accurately identify a gesture motion of the user. When the user uses the wristband subsequently, a location of the wristband may be different from a previous location. In this case, each round of sensors in the wristband may directly determine a current location of the wristband according to related displacement data (different locations of the wrist have different diameters, and therefore a cross-section shape formed by a current round of sensors may be obtained by means of calculation according to displacement data detected by the sensors, so as to estimate a location of the wristband on the wrist), and calculate a location difference between a current location of the sensor, and a location of the sensor when the wristband is used for the first time, so as to complete a deviation correction. Alternatively, in a process of using the wristband, a round of sensors closest to the round of sensors that is located in the middle of the wristband when the wristband is used for the first time is automatically found according to current location information corresponding to each round of sensors, and data detected by the found round of sensors is used.

A calibration process may be as follows: 1. A user wears a wristband. 2. The wristband establishes communication with a terminal. 3. Enable a calibration mode. 4. Display a calibration interface on a display screen of the terminal. 5. The wristband instructs the terminal to display a "1" key. 6. The user uses the thumb of a hand with the wristband to touch the first finger joint of the index finger, which indicates that the "1" key is pressed, and the touch continues until the terminal completes identification. 7. Current location information of a sensor in the wristband is recorded in the wristband, and the current location information is used as a reference to complete a calibration of the "1" key. For calibration processes of other keys, refer to the foregoing calibration process of the "1" key.

Certainly, the foregoing method for acquiring the mode-enabling gesture information of the user is also applicable to acquiring of other gesture information of the user.

In this embodiment, a specific method for acquiring mode-enabling gesture information is given, but is not a unique method for acquiring gesture information of a user. For example, gesture information of a user may further be acquired by using a method for identifying gesture information of a user by using bioelectricity, and by using a method in which a contact sensor is installed at a finger location of a glove. It should be noted that, regardless of a location of a sensor disposed on a user hand, the sensor not only may be used to detect related sensing information of a mode-enabling gesture, but also may be used to detect sensing information of a related gesture when the user performs a slide operation or a tap operation on a palm or a finger after a system enters a keyboard input mode or a mouse input mode.

Figure 5:
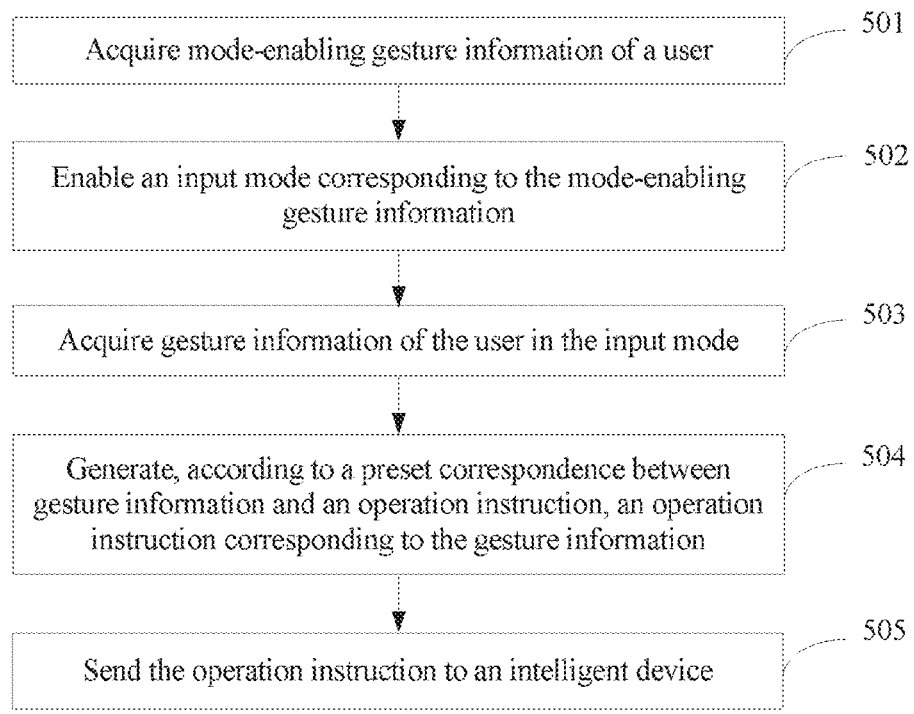
FIG. 5 is a flowchart of another information processing method according to an embodiment of the present invention.

FIG. 5 is a flowchart of another information processing method according to an embodiment of the present invention. As shown in FIG. 5, the information processing method may include:

Step 501: Acquire mode-enabling gesture information of a user.

Step 502: Enable an input mode corresponding to the mode-enabling gesture information.

The input mode includes a keyboard input mode and a mouse input mode.

Step 503: Acquire gesture information of the user in the input mode.

The gesture information includes tap-gesture information and/or slide-gesture information.

Step 504: Generate, according to a preset correspondence between gesture information and an operation instruction, an operation instruction corresponding to the gesture information.

Step 505: Send the operation instruction to a terminal.

The operation instruction is sent to the terminal in step 505, so that the terminal responds to the operation instruction, thereby implementing human-computer interaction.

In this embodiment, a user can implement convenient control of a terminal by using a customary input operation manner, for example, a tap operation and a touch-slide operation. In this method, the user does not need to memorize multiple correspondences between specific gesture motions and specific operations. Only by implanting beforehand a correspondence between a customary basic input operation of a user and a standard keyboard and mouse operation event into an execution body of the information processing method, a purpose of conveniently performing an input operation and controlling the terminal can be achieved.

Figure 6:
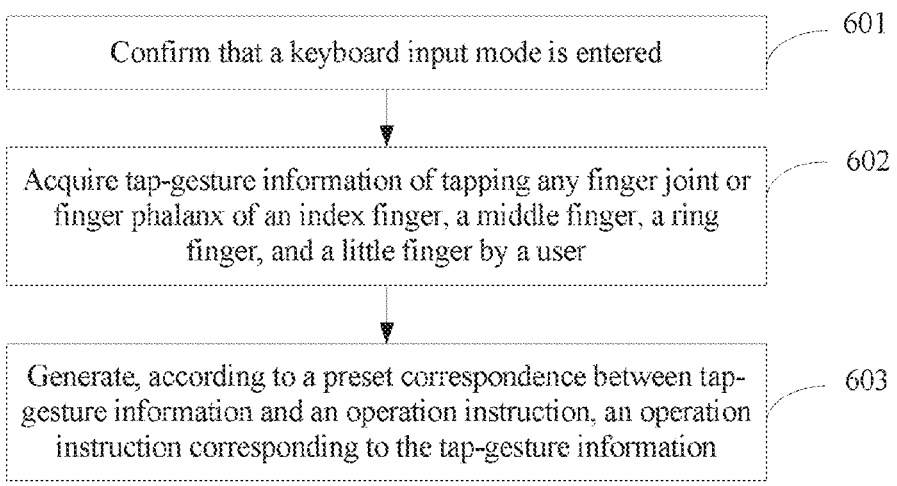
FIG. 6 is a flowchart of a third information processing method according to an embodiment of the present invention.

FIG. 6 is a flowchart of a third information processing method according to an embodiment of the present invention. As shown in FIG. 6, the information processing method may include.

Step 601: Confirm that a keyboard input mode is entered.

In the keyboard input mode, there is a one-to-one correspondence between 12 finger joints or finger phalanxes of an index finger, a middle finger, a ring finger, and a little finger of a user and 12 keys of a 12-key keypad.

Step 602: Acquire tap-gesture information of tapping any finger joint or finger phalanx of an index finger, a middle finger, a ring finger, and a little finger by a user.

Step 603: Generate, according to a preset correspondence between tap-gesture information and an operation instruction, an operation instruction corresponding to the tap-gesture information.

In this embodiment, keys of a 12-key keypad are respectively one-to-one corresponding to 12 finger joints or finger phalanxes, and such a correspondence is preconfigured in a system. Because basically all users are extremely familiar with a usage method of the 12-key keypad, and can also accurately sense locations of several finger joints or finger phalanxes, the users can conveniently and quickly implement information input without needing to memorize a correspondence between each key of a 12-key keypad and a fixed gesture motion.

Figure 7:
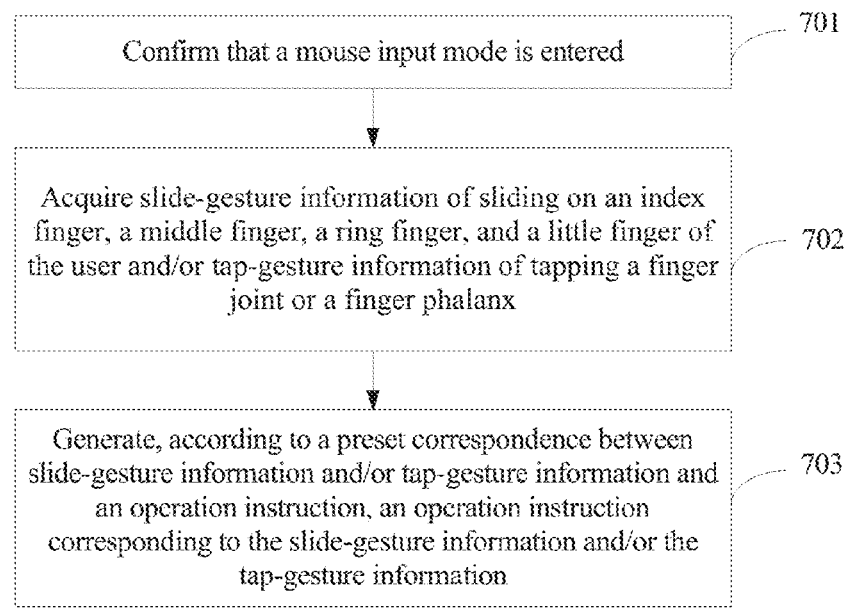
FIG. 7 is a flowchart of a fourth information processing method according to an embodiment of the present invention.

FIG. 7 is a flowchart of a fourth information processing method according to an embodiment of the present invention. As shown in FIG. 7, the method may include:

Step 701: Confirm that a mouse input mode is entered.

Step 702: Acquire slide-gesture information of a user on an index finger, a middle finger, a ring finger, and a little finger and/or tap-gesture information of tapping a finger joint or a finger phalanx of the index finger, the middle finger, the ring finger, and the little finger by the user.

Step 703: Generate, according to a preset correspondence between slide-gesture information and/or tap-gesture information and an operation instruction, an operation instruction corresponding to the slide-gesture information and/or the tap-gesture information.

The slide-gesture information is corresponding to movement track information of a mouse pointer, and the tap-gesture information is corresponding to trigger information of a left or right mouse button.

In this embodiment, several pieces of fixed gesture information of a user are corresponding to several basic operations of mouse operations, so that the user directly implements an input operation by performing a gesture motion on a palm in a familiar mouse operation manner or touchscreen operation manner, which is convenient and efficient, and the user does not need to memorize multiple correspondences between gesture motions and operations.

The foregoing embodiments disclosed in the present invention describe the methods in detail. The methods in the present invention may be implemented by using apparatuses in multiple forms. Therefore, the present invention further discloses an apparatus, which is described in detail in the following by using a specific embodiment.

Figure 8:
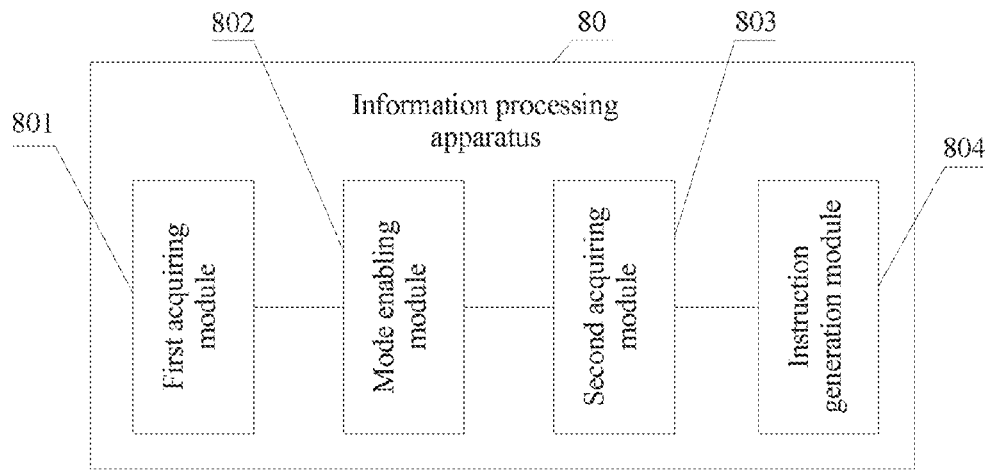
FIG. 8 is a schematic structural diagram of an information processing apparatus according to an embodiment of the present invention.

FIG. 8 is a schematic structural diagram of an information processing apparatus according to an embodiment of the present invention. As shown in FIG. 8, an information processing apparatus 80 may include: a first acquiring module 801, a mode enabling module 802, a second acquiring module 803, and an instruction generation module 804.

The first acquiring module 801 is configured to acquire mode-enabling gesture information of a user.

In this embodiment of the present invention, there may be multiple input modes for the user, and each input mode is corresponding to one mode-enabling gesture.

The mode enabling module 802 is configured to enable an input mode corresponding to the mode-enabling gesture information.

The input mode includes a keyboard input mode and a mouse input mode. The keyboard input mode described herein indicates that in this mode, the user may directly trigger a character on a known keyboard by tapping a part of a finger, where the character may be a digit, an English letter, or a symbol with a fixed function. The foregoing mouse input mode indicates that in this mode, the user may perform an operation on a palm like operating a mouse. In this case, an operation may include a slide operation and a tap operation. Certainly, in the foregoing two cases, it is required to preconfigure a correspondence between gesture information of a user and a standard keyboard or mouse operation event.

The second acquiring module 803 is configured to acquire gesture information of the user in the input mode, where the gesture information includes tap-gesture information and/or slide-gesture information.

It should be noted that, for same gesture information, different processing and response results may be obtained in different input modes, and a piece of gesture information may be processed and responded to in an input mode, but may not be processed and responded to in another input mode.

The instruction generation module 804 is configured to generate, according to a preset correspondence between gesture information and an operation instruction, an operation instruction corresponding to the gesture information.

A correspondence between gesture information and an operation instruction is implanted beforehand into a system program, which can be implemented by using the prior art. However, in this embodiment of the present invention, multiple input modes are introduced, and there is a separate correspondence between gesture information and an operation instruction in each input mode, because different processing and response results may be obtained in different input modes for same gesture information, which has been described above.

In this embodiment, the information processing apparatus can first acquire mode-enabling gesture information input by a user; then enter a corresponding input mode according to the mode-enabling gesture information input by the user, and identify gesture information of the user in a determined input mode; further, identify a user intention according to a preset correspondence between gesture information and an operation instruction. The foregoing input mode includes a keyboard input mode and a mouse input mode. In this way, the user can implement convenient control of a terminal in a familiar input mode environment by using only a customary input operation manner, for example, a tap operation and a touch-slide operation. The apparatus does not require the user to memorize multiple correspondences between specific gesture motions and specific operations. Only by implanting beforehand a correspondence between a customary basic input operation of a user and a standard keyboard and mouse operation event into an execution body of the information processing method, a purpose of conveniently performing an input operation and controlling the terminal by the user in a customary operation manner can be achieved.

In the foregoing embodiment, when the input mode is the keyboard input mode, there is a one-to-one correspondence between 12 finger joints or finger phalanxes of an index finger, a middle finger, a ring finger, and a little finger of a user and 12 keys of a 12-key keypad; the second acquiring module may be specifically configured to: acquire, in the keyboard input mode, tap-gesture information of tapping any finger joint or finger phalanx of the index finger, the middle finger, the ring finger, and the little finger by the user.

It may be understood that a 4*3 array of the 12 keys of the 12-key keypad is the same as a 4*3 array of the 12 finger joints or finger phalanxes of the index finger, the middle finger, the ring finger, and the little finger in a hand structure, and therefore, the 12 keys of the 12-key keypad may be one-to-one corresponding to the 12 finger joints or finger phalanxes. However, in this embodiment, a specific correspondence sequence is not specifically limited, and specifically, may be set according to user preference and habits.

In this embodiment, keys of a 12-key keypad are respectively one-to-one corresponding to 12 finger joints or finger phalanxes, and such a correspondence is preconfigured in a system. Because basically all users are extremely familiar with a usage method of the 12-key keypad, and can also accurately sense locations of several finger joints or finger phalanxes, the users can conveniently and quickly implement information input without needing to memorize a correspondence between each key of a 12-key keypad and a fixed gesture motion.

In a first embodiment, when the input mode is the mouse input mode, the second acquiring module may be specifically configured to: acquire, in the mouse input mode, slide-gesture information of sliding on an index finger, a middle finger, a ring finger, and a little finger of the user and/or tap-gesture information of tapping a finger joint or a finger phalanx.

In the mouse input mode, it may be preconfigured that the slide-gesture information of the user is corresponding to movement track information of a mouse pointer, and the tap-gesture information of the user is corresponding to trigger information of a left or right mouse button.

Specifically, to facilitate use for the user, in this embodiment, in the mouse input mode, a gesture motion of tapping any fingertip of the index finger, the middle finger, the ring finger, and the little finger by the user may be defined as a left mouse button trigger operation; a gesture motion of tapping any finger root of the index finger, the middle finger, the ring finger, and the little finger by the user may be defined as a right mouse button trigger operation.

In this embodiment, several pieces of fixed gesture information of a user are corresponding to several basic operations of mouse operations, so that the user directly implements an input operation by performing a gesture motion on a palm in a familiar mouse operation manner or touchscreen operation manner, which is convenient and efficient, and the user does not need to memorize multiple correspondences between gesture motions and operations.

It may be understood that, in the foregoing embodiment, mode-enabling gestures corresponding to different input modes are not fixedly limited. To facilitate use for a user, in this embodiment, the mode enabling module may include a first mode enabling module and a second mode enabling module, where the first mode enabling module may be configured to enable the keyboard input mode when the mode-enabling gesture information is corresponding to a gesture of extending an index finger, a middle finger, a ring finger, and a little finger of the user; and the second mode enabling module may be configured to enable the mouse input mode when the mode-enabling gesture information is corresponding to a gesture of curling the index finger, the middle finger, the ring finger, and the little finger toward the palm of the user.

Because the user may unconsciously separate several fingers when tapping different finger joints or finger phalanxes of the index finger, the middle finger, the ring finger, and the little finger, the gesture of extending the index finger, the middle finger, the ring finger, and the little finger of the user is corresponding to the keyboard input mode; the gesture of curling the index finger, the middle finger, the ring finger, and the little finger toward the palm of the user is corresponding to the mouse input mode, and a "panel" formed by the four curled fingers may be used to simulate a display screen, which is relatively close to a user operation habit. Certainly, mode-enabling gestures of the keyboard input mode and the mouse input mode are not fixedly limited.

In the foregoing embodiment, the first acquiring module 801 may be specifically configured to acquire mode-enabling gesture information that is of the user and is detected by a sensor disposed on a wrist or a palm of the user. Correspondingly, the second acquiring module may be specifically configured to acquire gesture information that is of the user and is detected by the sensor disposed on the wrist or the palm of the user. The sensor disposed on the wrist or the palm of the user can detect gesture motion information of a hand with the sensor.

Figure 9:
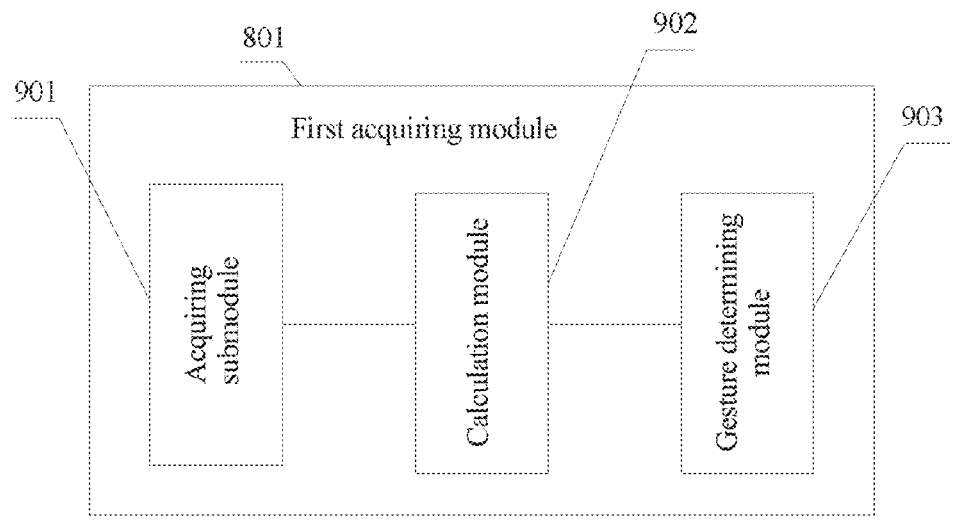
FIG. 9 is a schematic structural diagram of a first acquiring module according to an embodiment of the present invention.

FIG. 9 is a schematic structural diagram of a first acquiring module according to an embodiment of the present invention. As shown in FIG. 9, the first acquiring module 801 may specifically include an acquiring submodule 901, a calculation module 902, and a gesture determining module 903.

The acquiring submodule 901 is configured to acquire a pressure value of each part of the wrist or the palm when the sensor disposed on the wrist or the palm of the user detects an input mode-enabling gesture motion or a gesture motion.

The sensor disposed on the wrist of the user may be disposed in a wristband, and the sensor disposed on the palm of the user may be disposed in a glove or a mitten. If the sensor is disposed on the wrist of the user, gesture motions of the user may be determined according to different pressure that is caused by a muscle change and a motion change of each part of the wrist when the user makes different gestures. If the sensor is disposed on the palm of the user, gesture motions of the user may also be determined according to different pressure caused by a muscle change and a motion change of each part of the palm. If the sensor is disposed on a finger of the user, the sensor on the finger may directly detect touch information of a thumb of the user, to further determine gesture information of the user.

The calculation module 902 is configured to determine a displacement value of the sensor on the wrist or the palm of the user according to the pressure value.

Generally, a larger pressure change indicates a larger displacement value. There are two cases in which pressure becomes larger or smaller. Therefore, displacement also has different directions. Larger pressure indicates a larger displacement value of the sensor shifting from an original location. In this embodiment, there may be multiple sensors disposed on the wrist or the palm of the user, and the sensors may be disposed on different parts according to a requirement, so as to improve accuracy of a detection result.

The gesture determining module 903 is configured to determine, according to the displacement value, mode-enabling gesture information input by the user.

When the sensor is closer to a finger, a muscle group changes more obviously. Therefore, the sensor in the wristband may be disposed at a location close to the finger.

In this embodiment, a specific method for acquiring mode-enabling gesture information is given, but is not a unique method for acquiring gesture information of a user. For example, gesture information of a user may further be acquired by using a method for identifying gesture information of a user by using bioelectricity, and by using a method in which a contact sensor is installed at a finger location of a glove.

Figure 10:
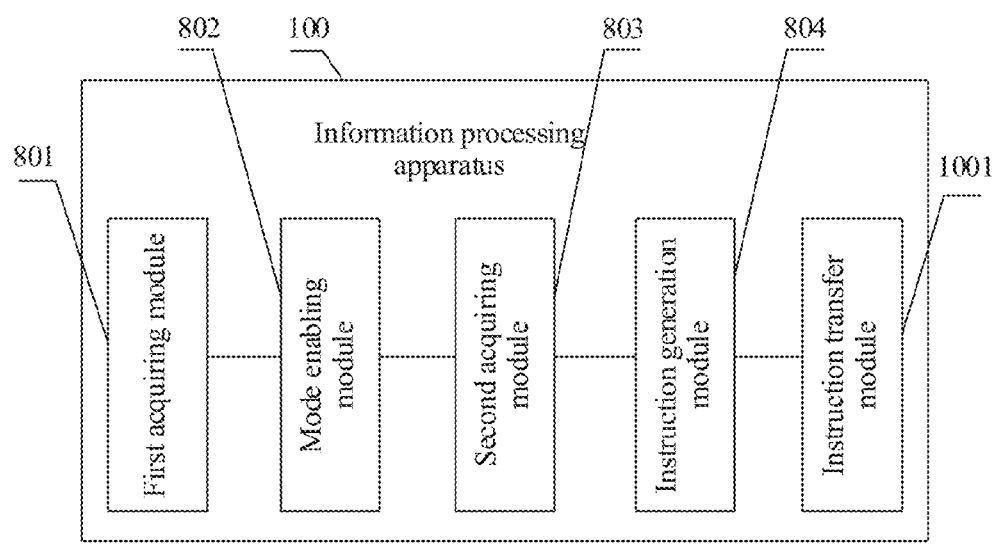
FIG. 10 is a schematic structural diagram of another information processing apparatus according to an embodiment of the present invention.

FIG. 10 is a schematic structural diagram of another information processing apparatus according to an embodiment of the present invention. As shown in FIG. 10, an information processing apparatus 100 may include: a first acquiring module 801, configured to acquire mode-enabling gesture information of a user; a mode enabling module 802, configured to enable an input mode corresponding to the mode-enabling gesture information; where the input mode includes a keyboard input mode and a mouse input mode; a second acquiring module 803, configured to acquire gesture information of the user in the input mode; where the gesture information includes tap-gesture information and/or slide-gesture information; an instruction generation module 804, configured to generate, according to a preset correspondence between gesture information and an operation instruction, an operation instruction corresponding to the gesture information; and an instruction transfer module 1001, configured to send the operation instruction to a terminal so that the terminal responds to the operation instruction.

The instruction transfer module 1001 sends the operation instruction to the terminal so that the terminal responds to the operation instruction, thereby implementing human-computer interaction.

In this embodiment, a user can implement convenient control of a terminal by using a customary input operation manner, for example, a tap operation and a touch-slide operation. In this method, the user does not need to memorize multiple correspondences between specific gesture motions and specific operations. Only by implanting beforehand a correspondence between a customary basic input operation of a user and a standard keyboard and mouse operation event into an execution body of the information processing method, a process of human-computer interaction can be conveniently implemented.

Figure 11:
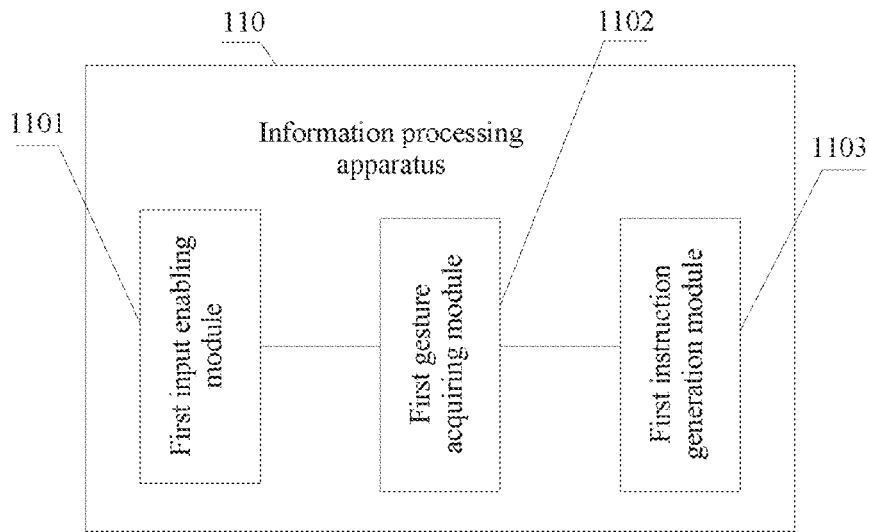
FIG. 11 is a schematic structural diagram of a third information processing apparatus according to an embodiment of the present invention.

FIG. 11 is a schematic structural diagram of a third information processing apparatus according to an embodiment of the present invention. As shown in FIG. 11, an information processing apparatus no may include: a first input enabling module 1101, configured to confirm that a system enters a keyboard input mode, where in the keyboard input mode, there is a one-to-one correspondence between 12 finger joints or finger phalanxes of an index finger, a middle finger, a ring finger, and a little finger of a user and 12 keys of a 12-key keypad; a first gesture acquiring module 1102, configured to acquire tap-gesture information of tapping any finger joint or finger phalanx of the index finger, the middle finger, the ring finger, and the little finger by the user; and a first instruction generation module 1103, configured to generate, according to a preset correspondence between tap-gesture information and an operation instruction, an operation instruction corresponding to the tap-gesture information.

In this embodiment, keys of a 12-key keypad are respectively one-to-one corresponding to 12 finger joints or finger phalanxes, and such a correspondence is preconfigured in a system. Because basically all users are extremely familiar with a usage method of the 12-key keypad, and can also accurately sense locations of several finger joints or finger phalanxes, the users can conveniently and quickly implement information input without needing to memorize a correspondence between each key of a 12-key keypad and a fixed gesture motion.

Figure 12:
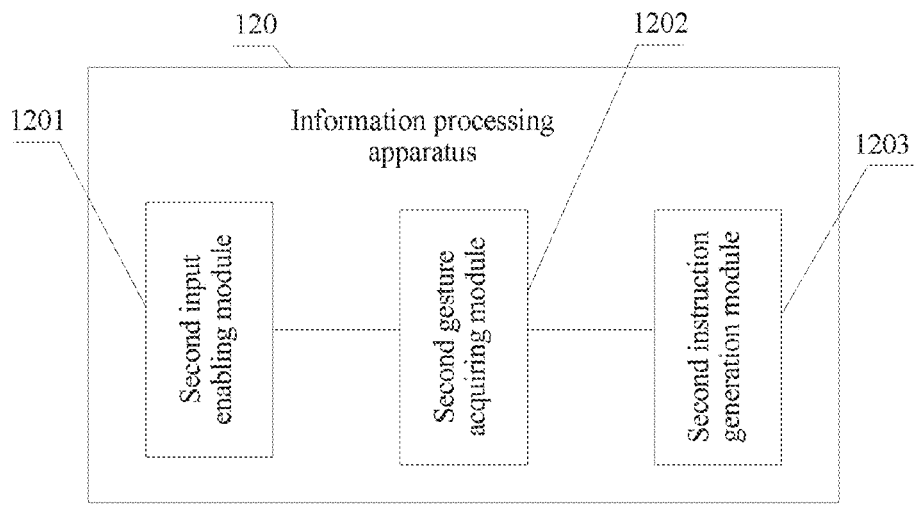
FIG. 12 is a schematic structural diagram of a fourth information processing apparatus according to an embodiment of the present invention.

FIG. 12 is a schematic structural diagram of a fourth information processing apparatus according to an embodiment of the present invention. As shown in FIG. 12, an information processing apparatus 120 may include: a second input enabling module 1201, configured to confirm that a system enters a mouse input mode; a second gesture acquiring module 1202, configured to acquire slide-gesture information of a user on an index finger, a middle finger, a ring finger, and a little finger and/or tap-gesture information of tapping a finger joint or a finger phalanx of the index finger, the middle finger, the ring finger, and the little finger by the user; and a second instruction generation module 1203, configured to generate, according to a preset correspondence between slide-gesture information and/or tap-gesture information and an operation instruction, an operation instruction corresponding to the slide-gesture information and/or the tap-gesture information.

The slide-gesture information may be corresponding to movement track information of a mouse pointer, and the tap-gesture information may be corresponding to trigger information of a left or right mouse button.

In this embodiment, several pieces of fixed gesture information of a user are corresponding to several basic operations of mouse operations, so that the user directly implements an input operation by performing a gesture motion on a palm in a familiar mouse operation manner or touchscreen operation manner, which is convenient and efficient, and the user does not need to memorize multiple correspondences between gesture motions and operations.

Further, an embodiment of the present invention further discloses an information processing device, where the information processing device includes any one of the information processing apparatuses disclosed in the foregoing embodiments. Because the information processing device includes any one of the information processing apparatuses disclosed in the foregoing embodiments, the information processing device can also first acquire mode-enabling gesture information input by a user; then enter a corresponding input mode according to the mode-enabling gesture information input by the user, and identify gesture information of the user in a determined input mode; further, identify a user intention according to a preset correspondence between gesture information and an operation instruction. The foregoing input mode includes a keyboard input mode and a mouse input mode. In this way, the user can implement convenient control of a terminal in a familiar input mode environment by using only a customary input operation manner, for example, a tap operation and a touch-slide operation. The device does not require the user to memorize multiple correspondences between specific gesture motions and specific operations. Only by implanting beforehand a correspondence between a customary basic input operation of a user and a standard keyboard and mouse operation event into an execution body of the information processing method, a purpose of controlling the terminal by the user in a customary operation manner can be achieved.

Figure 13:
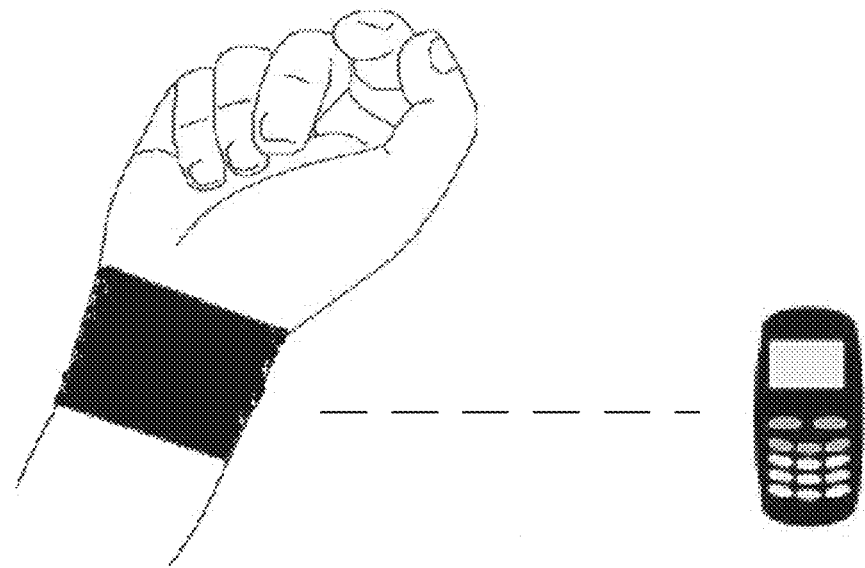
FIG. 13 is a schematic diagram of communication between an information processing device and a terminal according to an embodiment of the present invention.

Preferably, the information processing device may be any apparatus that has a processing function and can be worn on a user hand. The information processing device may exchange information with a terminal in a wireless communications manner or a Bluetooth manner. Specifically, the information processing device may transfer an operation instruction generated according to the gesture information of the user to the terminal, so that the terminal performs a response operation according to the operation instruction. FIG. 13 is a schematic diagram of communication between an information processing device and a terminal according to an embodiment of the present invention.

Preferably, the information processing device may be an intelligent terminal integrating the foregoing information processing apparatus and a terminal function, for example, a portable intelligent terminal. A smartwatch is used as an example of the portable intelligent terminal. Sensors may be disposed in a watchband of the watch, and the sensors in the watchband may determine gesture motions of the user according to different pressure that is caused by a muscle change and a motion change of each part of a wrist when the user makes different gestures. In this way, as long as a muscle group of a user wrist changes because of a finger motion, the gesture motion of the user may be finally determined according to data detected by the sensors, and then the sensors may transfer detected gesture information to the information processing apparatus. It should be noted that, after acquiring the gesture information of the user and generating a corresponding operation instruction, the information processing apparatus does not need to transfer the operation instruction to the smartwatch by using a wireless communications module or a Bluetooth module, but only needs to transfer the operation instruction by using a communications line inside the smartwatch. In addition, after receiving the operation instruction, the smartwatch can also normally respond to the operation instruction. Therefore, in addition to the foregoing easy-to-memorize advantage, particularly, when the information processing device is an intelligent terminal integrating the foregoing information processing apparatus and the terminal function, for example, a portable intelligent terminal, input accuracy can also be improved. A smartwatch is used as an example of the portable intelligent terminal. An input interface of the smartwatch is relatively small because of portability of the smartwatch. Entering a phone number is used as an example. When digits 1, 2, ..., 9, and 0 are entered by using a finger, the digits cannot be accurately entered usually because the input interface is small. However, by using the information processing method in this embodiment of the present invention, each digit has a piece of fixed corresponding gesture information. Therefore, a digit that the user wants to enter can be accurately determined by identifying the gesture information of the user, thereby greatly reducing or even avoiding a case in which the user cannot accurately enter information.

Figure 14:
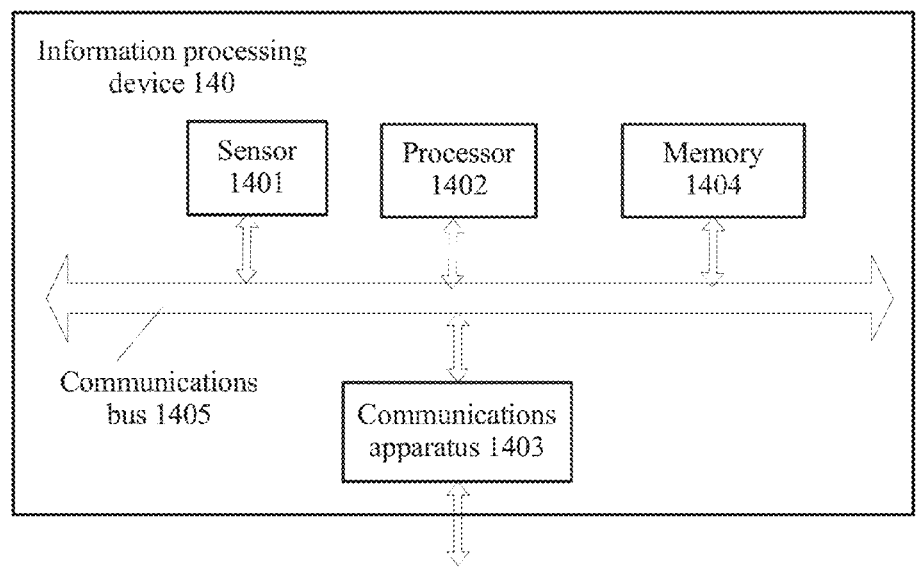
FIG. 14 is a schematic structural diagram of an information processing device according to an embodiment of the present invention.

FIG. 14 is a schematic structural diagram of an information processing device according to an embodiment of the present invention. As shown in FIG. 14, an information processing device 140 may include: a sensor 1401, a processor 1402, a communications apparatus 1403, a memory 1404, and a bus 1405.

The sensor 1401, the processor 1402, the communications apparatus 1403, and the memory 1404 complete mutual communication through the bus 1405.

The sensor 1401 is configured to collect gesture information of a user. The sensor 1401 may be a contact sensor, a pressure sensor, or a biological electrostatic sensor. As long as a sensor can detect different mode-enabling gesture information and gesture information of the user, the sensor may be applied in this embodiment.

The memory 1404 is configured to store a group of program instructions.

The memory may be a high-speed RAM memory, or may be a non-volatile memory (non-volatile memory), for example, at least one magnetic disk memory.

The processor 1402 is configured to invoke the program instructions stored in the memory 1404 to: acquiring mode-enabling gesture information of a user, where the mode-enabling gesture information may be detected by the sensor and then transferred to the processor 1402; enabling an input mode corresponding to the mode-enabling gesture information, where the input mode includes a keyboard input mode and a mouse input mode; acquiring gesture information of the user in the input mode, where the gesture information includes tap-gesture information and/or slide-gesture information; and generating, according to a preset correspondence between gesture information and an operation instruction, an operation instruction corresponding to the gesture information.

In this embodiment, there may be multiple input modes for the user, and each input mode is corresponding to one mode-enabling gesture. In this way, the processor 1402 may automatically identify, according to mode-enabling gesture information input by the user, an input mode currently wanted by the user, which facilitates use for the user.

The keyboard input mode indicates that in this mode, the user may directly trigger a character on a known keyboard by tapping a part of a finger, where the character may be a digit, an English letter, or a symbol with a fixed function, for example, a "#" key. Certainly, it is required to preconfigure a correspondence between gesture information of tapping or triggering a part of a finger by the user and each key of the known keyboard.

It should be noted that, for same gesture information, different processing and response results may be obtained in different input modes, and a piece of gesture information may be processed and responded to in an input mode, but may not be processed and responded to in another input mode.

The processor 1402 may be a central processing unit (CPU) or an application-specific integrated circuit ASIC (Application-Specific Integrated Circuit), or is one or more integrated circuits configured to implement this embodiment of the present invention.

The communications apparatus 1403 is configured to receive data in a service operation task. The communications apparatus 1403 may be specifically a wireless communications apparatus or a Bluetooth apparatus, so that the operation instruction generated by the processor 1402 is transferred to a terminal by using the wireless communications apparatus or the Bluetooth apparatus, and the terminal can respond to the operation instruction.

Figure 15:
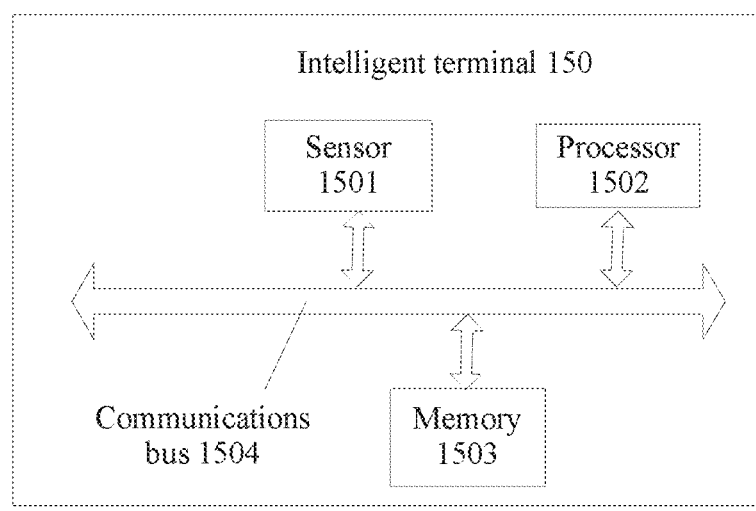
FIG. 15 is a schematic structural diagram of another information processing device according to an embodiment of the present invention.

FIG. 15 is a schematic structural diagram of another information processing device according to an embodiment of the present invention. As shown in FIG. 15, an intelligent terminal 150 may include: a sensor 1501, a processor 1502, a memory 1503, and a bus 1504.

The sensor 1501, the processor 1502, and the memory 1503 complete mutual communication through the bus 1504.

The sensor 1501 is configured to collect gesture information of a user. The sensor 1501 may be a contact sensor, a pressure sensor, or a biological electrostatic sensor. As long as a sensor can detect different mode-enabling gesture information and gesture information of the user, the sensor may be applied in this embodiment.

The memory 1503 is configured to store a group of program instructions.

The memory may be a high-speed RAM memory, or may be a non-volatile memory (non-volatile memory), for example, at least one magnetic disk memory.

The processor 1502 is configured to invoke the program instructions stored in the memory 1503: acquiring mode-enabling gesture information of a user, where the mode-enabling gesture information may be detected by the sensor; enabling an input mode corresponding to the mode-enabling gesture information, where the input mode includes a keyboard input mode and a mouse input mode; acquiring gesture information of the user in the input mode, where the gesture information includes tap-gesture information and/or slide-gesture information; generating, according to a preset correspondence between gesture information and an operation instruction, an operation instruction corresponding to the gesture information; and responding to the operation instruction.

In this embodiment, there may be multiple input modes for the user, and each input mode is corresponding to one mode-enabling gesture. In this way, the processor 1502 may automatically identify, according to mode-enabling gesture information input by the user, an input mode currently wanted by the user, which facilitates use for the user.

The keyboard input mode indicates that in this mode, the user may directly trigger a character on a known keyboard by tapping a part of a finger, where the character may be a digit, an English letter, or a symbol with a fixed function, for example, a "#" key. Certainly, it is required to preconfigure a correspondence between gesture information of tapping or triggering a part of a finger by the user and each key of the known keyboard.

It should be noted that, for same gesture information, different processing and response results may be obtained in different input modes, and a piece of gesture information may be processed and responded to in an input mode, but may not be processed and responded to in another input mode.

The processor 1502 may be a central processing unit CPU or an application-specific integrated circuit ASIC (Application Specific Integrated Circuit), or is one or more integrated circuits configured to implement this embodiment of the present invention.

The information processing device is integrated into the terminal. Therefore, after acquiring the gesture information of the user and generating a corresponding operation instruction, the processor does not need to transfer the operation instruction to the portable intelligent terminal by using a wireless communications module or a Bluetooth module, but only needs to transfer the operation instruction by using a communications line inside the portable intelligent terminal. In addition, after receiving the operation instruction, the processor of the portable intelligent terminal can also normally respond to the operation instruction. In addition, when the information processing device is an information processing device integrating the foregoing information processing apparatus and a terminal function, for example, a portable intelligent terminal, input accuracy may also be improved.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

It should further be noted that in this specification, relational terms such as first and second are only used to distinguish one entity or operation from another, and do not necessarily require or imply that any actual relationship or sequence exists between these entities or operations. Moreover, the terms "include", "include", or their any other variant is intended to cover a non-exclusive inclusion, so that a process, a method, an article, or a device that includes a list of elements not only includes those elements but also includes other elements that are not expressly listed, or further includes elements inherent to such a process, method, article, or device. An element preceded by "includes a . . . " does not, without more constraints, preclude the presence of additional identical elements in the process, method, article, or device that includes the element.

In combination with the embodiments disclosed in this specification, method or algorithm steps may be implemented by hardware, a software module executed by a processor, or a combination thereof. The software module may be configured in a random access memory (RAM), a memory, a read-only memory (ROM), an electrically programmable ROM, an electrically erasable programmable ROM, a register, a hard disk, a removable disk, a CD-ROM, or a storage medium in any other forms well-known in the art.

The embodiments disclosed are described in the foregoing to enable a person skilled in the art to implement or use the present invention. Various modifications to the embodiments are obvious to the person skilled in the art, and general principles defined in this specification may be implemented in other embodiments without departing from the spirit or scope of the present invention. Therefore, the present invention will not be limited to the embodiments described in this specification but extends to the widest scope that complies with the principles and novelty disclosed in this specification.

What is claimed is:

1. A method, comprising:
acquiring first pressure values of each part of a wrist of a user or a palm of the user when a sensor disposed on the wrist or the palm of the user detects a first input mode-enabling gesture motion or a first gesture motion of the user;
determining a first displacement value of the sensor on the wrist or the palm of the user according to the first pressure values;
determining, according to the first displacement value, first mode-enabling gesture information input by the user;
selecting an input mode to be either a keyboard input mode for a standard keyboard or a mouse input mode, in response to determining the first mode-enabling gesture information;
acquiring gesture information of the user while in the input mode, wherein the gesture information comprises tap-gesture information or slide-gesture information; and
generating, according to a preset correspondence between gesture information and operation instructions, operation instructions to the gesture information.

2. The method according to claim 1, wherein while the input mode is the keyboard input mode, there is a one-to-one correspondence between 12 finger joints or finger phalanxes of an index finger, a middle finger, a ring finger, and a little finger of a user and 12 keys of a 12-key keypad;
wherein acquiring gesture information of the user while in the input mode comprises acquiring, in the keyboard input mode, tap-gesture information of tapping any finger joint or finger phalanx of the index finger, the middle finger, the ring finger, and the little finger by the user; and
wherein generating, according to the preset correspondence between the gesture information and the operation instructions, the operation instructions corresponding to the gesture information, comprises generating, according to a preset correspondence between tap-gesture information and operation instructions, operation instructions corresponding to the tap-gesture information.

3. The method according to claim 1:
wherein acquiring gesture information of the user while in the input mode comprises, in response to the input mode being the mouse input mode, acquiring, in the mouse input mode, at least one of slide-gesture information of sliding on an index finger, a middle finger, a ring finger, or a little finger of the user or tap-gesture information of tapping a finger joint or a finger phalanx; and wherein generating, according to the preset correspondence between the gesture information and the operation instructions, the operation instructions corresponding to the gesture information, comprises, in response to the input mode being the mouse input mode, generating, according to a preset correspondence between at least one of slide-gesture information or tap-gesture information and operation instructions, the operation instructions corresponding to at least one of the slide-gesture information or the tap-gesture information.

4. The method according to claim 3, wherein the slide-gesture information corresponds to movement track information of a mouse pointer, and the tap-gesture information corresponds to trigger information of a left or a right mouse button.

5. The method according to claim 1, wherein selecting the input mode to be either the keyboard input mode for the standard keyboard or the mouse input mode, in response to acquiring the first mode-enabling gesture information, comprises:
selecting the keyboard input mode in response to the first mode-enabling gesture information corresponding to a gesture of extending an index finger, a middle finger, a ring finger, and a little finger of the user; and
selecting the mouse input mode when the first mode-enabling gesture information corresponds to a gesture of curling the index finger, the middle finger, the ring finger, and the little finger toward a palm of the user.

6. The method according to claim 1, wherein the gesture information is detected by the sensor disposed on a wrist or a palm of the user.

7. The method according to claim 6, wherein acquiring the gesture information of the user while in the input mode comprises:
acquiring second pressure values of each part of the wrist or the palm in response to the sensor disposed on the wrist or the palm of the user detecting a second input mode-enabling gesture motion or a second gesture motion of the user;
determining a second displacement value of the sensor on the wrist or the palm of the user according to the second pressure values; and
determining, according to the second displacement value, second mode-enabling gesture information input by the user.

8. The method according to claim 1, further comprising sending the operation instructions to a terminal, wherein the terminal responds to the operation instructions after generating, according to the preset correspondence between the gesture information and the operation instructions, the operation instructions corresponding to the gesture information.

9. An apparatus, comprising:
a sensor, configured to be disposed on a wrist or a palm of a user;
a processor; and
a non-transitory computer readable storage medium storing a program for execution by the processor, wherein the processor and the non-transitory computer readable storage medium are coupled to each other using a bus, the program including instructions to:
acquire pressure values of each part of the wrist or the palm in response to the sensor disposed on the wrist or the palm of the user detecting an input mode-enabling gesture motion;
determine a displacement value of the sensor on the wrist or the palm of the user according to the pressure values;
determine, according to the displacement value, mode-enabling gesture information input by the user;
select an input mode to be either a keyboard input mode for a standard keyboard or a mouse input mode, in response to acquiring the mode-enabling gesture information;
acquire gesture information of the user while in the input mode, wherein the gesture information comprises at least one of tap-gesture information or slide-gesture information; and
generate, according to a preset correspondence between gesture information and operation instructions, an operation instructions corresponding to the gesture information.

10. The apparatus according to claim 9, wherein the instructions further comprise instructions to acquire, in the keyboard input mode, tap-gesture information of tapping any finger joint or finger phalanx of an index finger, a middle finger, a ring finger, and a little finger, by the user.

11. The apparatus according to claim 9, wherein the instructions further comprise instructions to acquire, in the mouse input mode, at least one of slide-gesture information of sliding on an index finger, a middle finger, a ring finger, and a little finger of the user or tap-gesture information of tapping a finger joint or a finger phalanx.

12. The apparatus according to claim 11, wherein the slide-gesture information corresponds to movement track information of a mouse pointer, and wherein the tap-gesture information corresponds to trigger information of a left or a right mouse button.

13. The apparatus according to claim 9, wherein the instructions further comprise instructions to:
select the keyboard input mode in response to the mode-enabling gesture information corresponding to a gesture of extending an index finger, a middle finger, a ring finger, and a little finger of the user; and
select the mouse input mode in response to the mode-enabling gesture information corresponding to a gesture of curling the index finger, the middle finger, the ring finger, and the little finger toward a palm of the user.

14. The apparatus according to claim 9, wherein the gesture information is detected by the sensor disposed on a wrist or a palm of the user.

15. The apparatus according to claim 9, wherein the instructions further comprise instructions to:
send the operation instruction to a terminal for the terminal to respond to the operation instruction.

16. A non-transitory computer readable storage medium storing a program for execution by a processor, the program including instructions to:
acquire pressure values of each part of a wrist or a palm of a user in response to a sensor disposed on the wrist or the palm of the user detecting an input mode-enabling gesture motion;
determine a displacement value of the sensor on the wrist or the palm of the user according to the pressure values;

determine, according to the displacement value, mode-enabling gesture information input by the user;
select an input mode to be either a keyboard input mode for a standard keyboard or a mouse input mode, in response to acquiring the mode-enabling gesture information;
acquire gesture information of the user while in the input mode, wherein the gesture information comprises at least one of tap-gesture information or slide-gesture information; and
generate, according to a preset correspondence between the gesture information and operation instructions, operation instructions corresponding to the gesture information.

\* \* \* \* \*

UNITED STATES PATENT AND TRADEMARK OFFICE
CERTIFICATE OF CORRECTION

PATENT NO. : 9,965,044 B2  
APPLICATION NO. : 15/114033  
DATED : May 8, 2018  
INVENTOR(S) : Lei Chen Page 1 of 1

It is certified that error appears in the above-identified patent and that said Letters Patent is hereby corrected as shown below:

In the Claims

In Column 22, Line 48, Claim 1, delete "instructions to the gesture information" and insert --instructions corresponding to the gesture information--.

Signed and Sealed this  
Thirty-first Day of July, 2018

Andrei Iancu  
*Director of the United States Patent and Trademark Office*